Figures 1, 2:
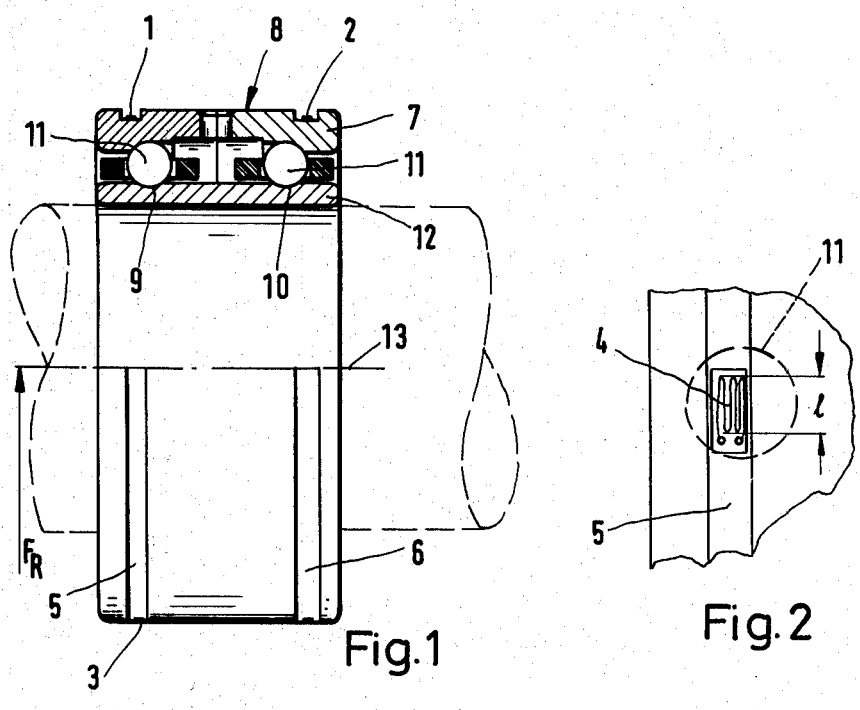

United States Patent [19]

Lechler et al.

[11] 4,341,122

[45] Jul. 27, 1982

[54] FORCE MEASURING DEVICE

[75] Inventors: Gerhard B. Lechler, Mühlenstrasse 58, 1000 Berlin 46; Otto G. Richter, Berlin, both of Fed. Rep. of Germany

[73] Assignee: Gerhard B. Lechler, Berlin, Fed. Rep. of Germany

[21] Appl. No.: 130,073

[22] Filed: Mar. 13, 1980

[30] Foreign Application Priority Data

Mar. 22, 1979 [DE] Fed. Rep. of Germany ....... 2911479

[51] Int. Cl.$^3$ .......................... G01L 5/12; G01L 5/16
[52] U.S. Cl. ............................. 73/862.04; 73/862.49; 73/862.54; 73/862.67
[58] Field of Search .................... 73/140, 141 A, 765, 73/862.04, 862.06, 862.49, 862.54, 862.67

[56] References Cited

U.S. PATENT DOCUMENTS 3,791,204  2/1974  List et al. ........................ 73/765 X
4,203,319  5/1980  Lechler .............................. 73/140

OTHER PUBLICATIONS

Stein, P., "Measuring Bearing Strain", Instruments & Control Systems, vol. 37, Nov. 1964, pp. 132-138.

Primary Examiner—Charles A. Ruehl
Attorney, Agent, or Firm—Parmelee, Johnson, Bollinger & Bramblett

[57] ABSTRACT

In a device for simultaneously measuring radial and axial forces with the aid of measuring positions (24, 25, 26, 27) arranged at roller bearings and formed by resistance strain gauges, possibilities for eliminating apparent axial forces, which could falsify the results of the measurements, are shown.

9 Claims, 8 Drawing Figures

FORCE MEASURING DEVICE

The invention relates to a device for measuring forces with the aid of roller bearings which are suitable for absorbing radial and axial forces and the outer and/or inner rings of which are provided with resistance strain gauges which are arranged at different measuring positions and which are used to pick up the cyclic strains, the measuring positions being arranged in such a manner that, when the bearing is loaded, the cyclic strains to be picked up change to different degrees, and the changes in resistance of the resistance strain gauges being sensed individually, amplified individually and rectified individually and signals, which are proportional to the external forces, being obtained by subtracting rectified signals.

Such devices are particularly suitable for the automatic monitoring of forces in machine tools and processing machines. They facilitate the introduction of automatic processing systems and offer possibilities for increasing the accuracy of the machines.

In German Offenlegungsschrift No. 2,746,937 (corresponding to U.S. Pat. No. 4,203,319) a device of the type considered has already been proposed which is equipped with a tapered roller bearing at the front and one at the back, the front one of which is equipped with two measuring positions and the rear one of which is equipped with one. The said bearing can be used to measure either in each case radial or in each case axial forces. It has been shown, however, that simultaneous measurement of radial and axial forces or components of radial and axial forces is not possible. The reason for this is that, as a rule, radial forces produce apparent axial forces. Such apparent axial forces arise by virtue of the different bearing ratio percentages allocated to the rows of roller bearings arranged at a distance from one another.

It is the basic object of the invention to produce a device of the type considered, with which simultaneously radial and axial forces can be measured, that is to say also forces acting at an angle and containing radial and axial components, without giving rise to interfering apparent forces.

The inventor proposes that the abovementioned object can be achieved in two ways.

The first way consists in that the device, in which three measuring positions are used of which two are allocated to a first and one to a second row of roller bearings, is provided with a compensating device which compensates for or eliminates the different bearing ratio percentages, and the apparent axial forces resulting from these, which act on the two rows of roller bearings with pure radial forces, by reinforcing the weaker signal of the measuring positions to which the radial force is applied in the same direction, until the respective apparent force disappears.

According to the second preferred solution, the device is provided, according to the invention, with four measuring positions arranged in mutually opposite pairs and distributed to a first and a second row of roller bearings, and with different loading of the measuring positions for each component the sum of the measured values from the two measuring positions, which are in each case relieved by the component to be measured, is subtracted from the sum of the measured values from the two measuring positions which are in each case loaded.

The two devices according to the invention offer the advantage that they can be used to simultaneously measure radial and axial forces or components of radial and axial forces, without the result of the measurements being distorted by apparent forces of the type described initially.

Figure 3:
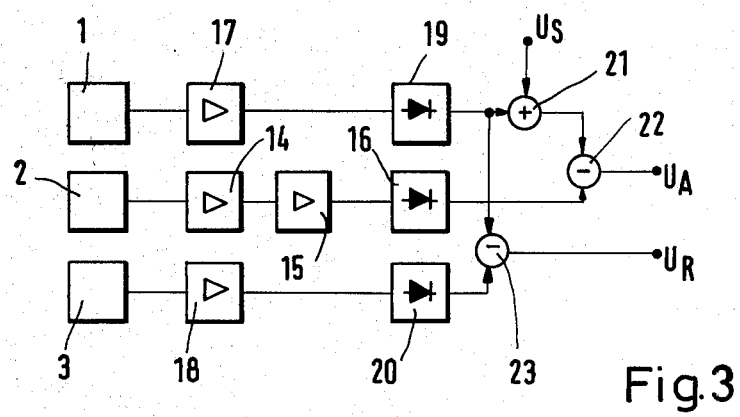
Figure 4:
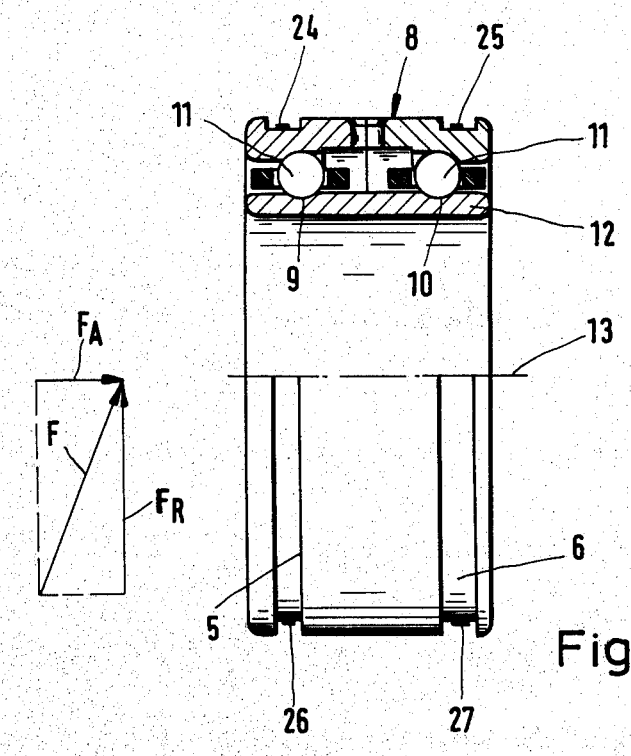
Figure 5:
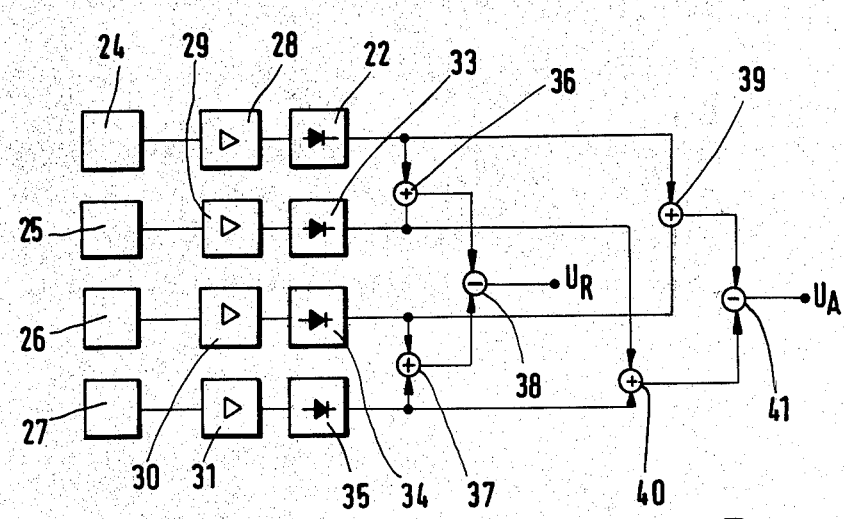
Figure 6:
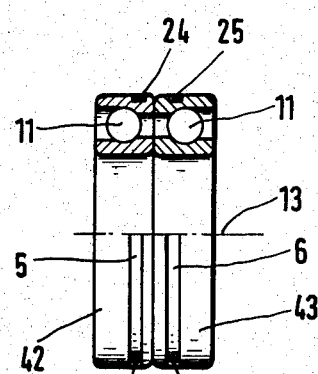
Figure 7:
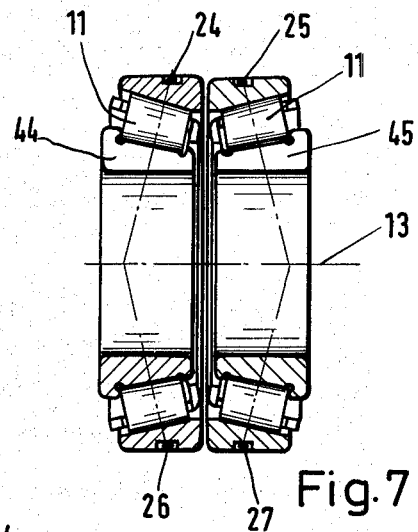
Figure 8:
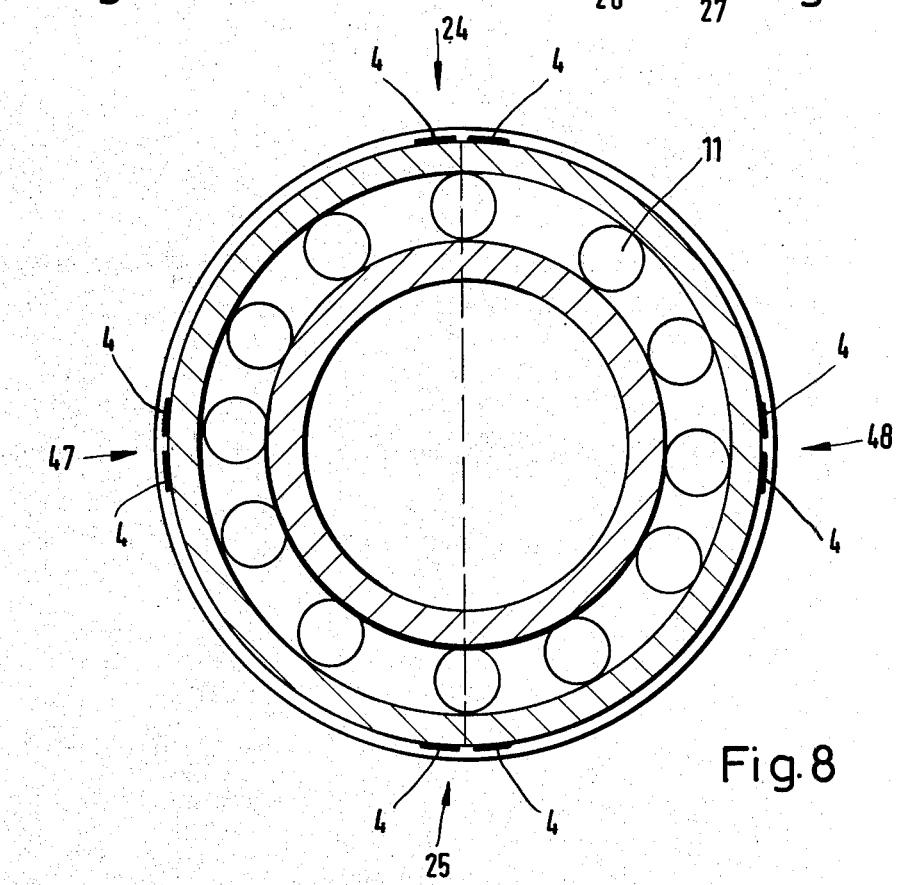

In the text which follows the invention is explained in greater detail with the aid of several illustrative embodiments represented in the attached drawing, in which:

FIG. 1 shows in partial section a force meter constructed as a two-row angular ball bearing, provided with three measuring positions, FIG. 2 shows a top view of a measuring position of the force meter of FIG. 1, on an enlarged scale, FIG. 3 shows the block diagram of the electric part of a device equipped with a force meter according to FIG. 1, FIG. 4 shows in partial section a force meter constructed as a two-row angular ball bearing, provided with four measuring positions, FIG. 5 shows the block diagram of the electric part of a device equipped with a force meter according to FIG. 4, FIG. 6 shows a partial section of a force meter consisting of two angular ball bearings, with four measuring positions, FIG. 7 shows a section through a force meter consisting of two tapered roller bearings, with four measuring positions, and FIG. 8 shows a section through the front angular ball bearing of a force meter consisting of two angular ball bearings.

The force meter shown in FIG. 1 is provided with three measuring positions 1, 2 and 3, at which in each case a resistance strain gauge 4 is arranged (see FIG. 2). Each resistance strain gauge 4 is bonded into a groove 5 or 6 on the outside of the outer ring 7 of a two-row angular ball bearing 8 having two rows 9 and 10 of roller bearings 11 and an inner ring 12. As indicated in FIG. 2, the length 1 of the grating of each resistance strain gauge 4 is less than the diameter of the roller bearings 11. The best results are obtained if the difference in measurements is of the order of 10 to 30%. It is possible to provide each measuring position not only with one but with several, and in particular two, resistance strain gauges. All measuring positions 1, 2 and 3 should be located, together with the longitudinal axis 13 of the angular ball bearing 8, in a plane which coincides with the plane of action of the radial force $F_R$.

In a force meter, which is, for example, built into a spindle bore, the radial force $F_R$ transmitted via the spindle to the inner ring 12 will load the row of roller bearings 9, which is closer to it, to a greater extent than the row of roller bearings 10 which is more remote from it. The result is that when the force meter is loaded unequal voltage changes $\Delta U_1$ and $\Delta U_2$ occur at the measuring positions 1 and 2. However, different voltage changes at the measuring positions 1 and 2 also occur when axial forces $F_A$ are acting on the force meter. The different bearing ratio percentages acting on rows 9 and 10 of the roller bearings when loaded by purely radial forces would, therefore, lead to an apparent axial force being indicated if axial forces are measured simultaneously. In order to prevent this the voltage changes, occurring under load, at the measuring positions 1 and 2 are amplified to different degrees with the aid of a compensating amplifier 15, which follows the amplifier 14 for the measuring position 2 and from which the signal of the measuring position 2 reaches a rectifier 16. The amplifiers 17 and 18 for the measuring positions 1 and 3, in contrast, are connected directly to the rectifiers 19 and 20.

If the different bearing ratio percentages of the rows 9 and 10 of roller bearings are accounted for by multipliers for the radial force and if a multiplier (1−f) is allocated to the row 9 of roller bearings and a multiplier f to the row 10 of roller bearings, at measuring position 1 voltage changes $$\Delta U_1 = \Delta U_R(1-f) \tag{1}$$

and at measuring position 2 voltage changes $$\Delta U_2 = \Delta U_R f \tag{2}$$

are obtained, where f is smaller than 1 and $\Delta U_R$ is a voltage change which would occur with identical bearing ratio percentages under the influence of a radial force. The voltage changes must be amplified in such a manner that their difference $\Delta U'_1 - \Delta U'_2$ at the outputs of the rectifier 16 and 19 becomes zero. Thus the following condition must be met:

$$\Delta U'_1 - \Delta U'_2 = 0 = V_1 \Delta U_R(1-f) - V_2 \cdot \Delta U_R f \tag{3}$$

where $V_1$ and $V_2$ are the amplification factors. If equation (3) is solved for $V_2$, $$V_2 = V_1(1-f)/f \tag{4}$$

If the amplifier 14 and the compensating amplifier 15 produces an amplification which corresponds to the amplification factor $V_2$, the different bearing ratio percentages of the rows 9 and 10 of roller bearings are balanced and a voltage difference between the measuring positions 1 and 2 arises only if the force meter is actually loaded by an axial force $F_A$.

Compensation provides for the different output voltages $U_{o1}$ and $U_{o2}$ of the measuring positions 1 and 2, occurring under no load, also to be compensated. These different output voltages arise due to the fact that the voltage $U_o$, caused by the unavoidable pretension on the bearing, and the voltage changes $\Delta U$ caused by external forces, are amplified differently, the amplified and rectified voltages becoming $$U'_{o1} = V_1 \cdot U_o \tag{5}$$

and $$U'_{o2} = V_1(1-f)/f \, U_o \tag{6}$$

To equalize the difference between $U'_{o1}$ and $U'_{o2}$, a correction voltage $U_s$ is used, the magnitude of which can be determined in the following way:

$$U'_{o1} - U'_{o2} = 0 = V_1 U_o - V_1(1-f)/f \, U_o + U_s \tag{7}$$

$$U_s = V_1 U_o(1-2f)/f \tag{8}$$

An adder 21 is used to add this correction voltage $U_s$ to the rectified voltage $U'_{o1} + \Delta U'_1$ which originates from the measuring position 1 and is amplified by the amplifier 17 to a lesser degree than the voltage supplied by the measuring position 2.

When the angular ball bearing 8 is located by a radial force $F_R$, a subtraction circuit 22 is supplied with voltages $$U'_1 = U'_{o1} + \Delta U'_1 + U_s \tag{9}$$

and $$U'_2 = U'_{o2} + \Delta U'_2 \tag{10}$$

originating from the measuring positions 1 and 2, where $U'_{o1}$ and $U'_{o2}$ are the amplified and rectified voltages occurring under no load and originating from the measuring positions 1 and 2, and $\Delta U'_1$ and $\Delta U'_2$ are the voltage changes which originate from the same measuring positions and which are also amplified and rectified and are a function of the radial force $F_R$. The subtraction circuit 22 supplies a difference signal $U_A$ which corresponds to an axial force $F_A$ acting on the angular ball bearing 8. That this difference signal $U_A$ is different from zero only if an axial force $F_A$ is actually acting on the bearing, becomes clear from the following derivation:

$$U'_1 - U'_2 = (U_{o1} + U_s + \Delta U'_1) - (U'_{o2} + \Delta U'_2) \tag{11}$$

$$= \left( V_1 U_o + V_1 U_o \frac{1-2f}{f} + V_1 \Delta U_R(1-f) - \right.$$

$$\left. \left( V_1 \frac{1-f}{f} U_o + V_1 \frac{1-f}{f} \Delta U_R f \right) \right.$$

$$= V_1 U_o \left( 1 + \frac{1-2f}{f} - \frac{1-f}{f} \right) +$$

$$V_1 \Delta U_R \left( (1-f) - \frac{1-f}{f} \cdot f \right)$$

$$= V_1 U_o \left( \frac{f + 1 - 2f - 1 + f}{f} \right) +$$

$$V_1 \Delta U_R((1-f) - (1-f))$$

$$= 0 \tag{12}$$

The difference signal $U_R$ corresponding to the radial force $F_R$ is supplied by a subtraction circuit 23 which is supplied with the amplified and rectified voltages originating from the measuring positions 1 and 3.

The measuring device discussed above does not work with the same accuracy as the second measuring device described hereafter. The reason for the limited accuracy lies in the fact that particularly thermal effects can change the inner bearing forces and the voltage $U_o$ proportional to these. In that event, equalization with a constant correction voltage is no longer adequate because of the different amplification of the voltages $U_{o1}$ and $U_{o2}$.

The force measuring device described in FIGS. 4 and 5 is provided with four measuring positions 24, 25, 26 and 27, the configuration of which corresponds to the configuration of the measuring positions 1, 2 and 3. The four measuring positions 24, 25, 26 and 27 are located, together with the longitudinal axis 13 of the angular ball bearing 8 which is also here used as the force meter, in a plane which coincides with the drawn plane of section and in which a force F acts which can be split into an axial component $F_A$ and a radial component $F_R$.

The signals from the four measuring positions are amplified by the amplifiers 28, 29, 30 and 31 and then rectified by rectifiers 32, 33, 34 and 35. In the no-load condition of the angular ball bearing 8 at the output of all rectifiers the same voltage $U'_o$ is present which originates from the necessary pre-tension of the bearing, that is to say, $U'_{o24}$, $U'_{o25}$, $U'_{o26}$ and $U'_{o27}$ are all equal to $U'_o$.

The axial component $F_A$ and the radial component $F_R$ of force F produce voltage changes $\Delta U_{24}$, $\Delta U_{25}$, $\Delta U_{26}$ and $\Delta U_{27}$ at the measuring positions 24, 25, 26 and 27.

In order to determine a signal $U_R$, which is proportional to the component of radial force $F_R$, the amplified and rectified signals $U'_{24}$ and $U'_{25}$ originating from the measuring positions 24 and 25 are added in an adder 36 and the amplified and rectified signals $U'_{26}$ and $U'_{27}$ originating from the measuring positions 26 and 27 are added in an adder 37. The sum signals $(U'_{24}+U'_{25})$ and $(U'_{26}+U'_{27})$ obtained are then subtracted from one another in a subtraction circuit 38 for determining the signal $U_R$ corresponding to the radial component of force $F_R$.

$$U_R=(U'_{24}+U'_{25})-(U'_{26}+U'_{27}) \qquad (13)$$

In order to generate a signal $U_A$, which is proportional to the axial component of force $F_A$, the amplified and rectified signals $U'_{24}$ and $U'_{26}$ originating from the measuring positions 24 and 26 are added in an adder 39 and the amplified and rectified signals $U'_{25}$ and $U'_{27}$ originating from the measuring positions 25 and 27 are added in an adder 40. The sum signal $(U'_{24}+U'_{26})$ obtained is than subtracted from the sum signal $(U'_{25}+U'_{27})$ in a subtraction circuit 41. The difference is the signal $U_A$.

$$U_A=(U'_{24}+U'_{26})-(U'_{25}+U'_{27}) \qquad (14)$$

The voltage $U_{24}$, which is obtained when the angular ball bearing 8 is loaded by the force F, is composed of three components which are the voltage $U_{o24}$ corresponding to the pre-tension of the bearing, a voltage $\Delta U_{24R}$ generated by the radial component of force $F_R$ and a voltage $\Delta U_{24A}$ generated by the axial component of force.

Similar considerations apply to the voltages $U_{25}$, $U_{26}$ and $U_{27}$, the voltages $\Delta U_{24R}$ and $\Delta U_{25R}$, generated by the components of force $F_R$, being positive and $\Delta U_{26R}$ and $\Delta U_{27R}$ being negative, whereas the voltages $\Delta U_{25A}$ and $\Delta U_{27A}$, generated by the component of force $F_A$, are positive and $\Delta U_{26R}$ and $\Delta U_{26A}$ are negative.

By rearranging the equation (13), $U_R$ thus becomes $$U_R=[(U'_o+\Delta U'_{24R}-\Delta U'_{24A})+(U'_o+\Delta U'_{25R}+\Delta U'_{25A})] \\ -[(U'_o-\Delta U'_{26R}-\Delta U'_{26A})+(U'_o-\Delta U'_{27R}+\Delta U'_{27A})] \qquad (15)$$

If the different bearing ratio percentages of the rows 9 and 10 of the roller bearings are taken into consideration as in the first illustrative embodiment by the multipliers $(1-f)$ and $f$, $$\Delta U'_{24R}=\Delta U'_R(1-f) \qquad (16)$$

$$\Delta U'_{25R}=\Delta U'_R f \qquad (17)$$

$$\Delta U'_{26R}=\Delta U'_R(1-f) \qquad (18)$$

$$\Delta U'_{27R}=\Delta U'_R(f) \qquad (19)$$

and $$U_R=[(U'_o+\Delta U'_R(1-f)-\Delta U'_{24A})+(U'_o+\Delta U'_R f+\Delta U'_{25A})] \\ -[(U'_o-\Delta U'_R(1-f)-\Delta U'_{26A})+(U'_o-\Delta U'_R(f)+\Delta U'_{27A})] \qquad (20)$$

Since, under the influence of the axial component of force $F_A$, the amount of loading on the measuring positions 25 and 27 is in each case equal to the amount of relief at the measuring positions 24 and 26.

$$|\Delta U'_{25A}|=|\Delta U'_{27A}|=|\Delta U'_{24A}|=|\Delta U'_{26A}| \qquad (21)$$

applies and $$U_R=2\Delta U'_R. \qquad (22)$$

Accordingly, equation (14) can be rearranged as follows:

$$U_A=[(U'_o+\Delta U'_{24R}-\Delta U'_{24A})+(U'_o-\Delta U'_{26R}-\Delta U'_{26A})] \\ -[(U'_o+\Delta U'_{25R}+\Delta U'_{25A})+(U'_o-\Delta U'_{27R}+\Delta U'_{27A})] \qquad (23)$$

Taking into consideration equations (14) to (19) and (21), $$U_A=-4\Delta U'_{24A}. \qquad (24)$$

Equations (22) and (24) show that the output signals $U_R$ and $U_A$ are a function only of the radial component of force $F_R$ and the axial component of force $F_A$, respectively.

The measuring device equipped with four measuring positions offers the advantage that all four measured signals are amplified in the same manner. This facilitates balancing and calibration and changes in the pretension of the bearing due to thermal effects have no effect on the output signals $U_R$ and $U_A$, in other words, there is no shift in the zero point of the force indication.

FIG. 6 shows a force meter for a force measuring device, which consists of two angular ball bearings 42 and 43 but the construction of which, for the rest, largely corresponds to the force meter of FIG. 4 and which, consequently, does not require any more detailed explanation. Similar considerations apply to the force meter shown in FIG. 7 and consisting of two tapered roller bearings 44 and 45.

FIG. 8 shows a section through the front angular ball bearing 46 of a force meter corresponding to the force meter shown in FIG. 6. In this case, at all measuring positions two resistance strain gauges 4 are arranged in each case and, additionally to the measuring positions 24, 25, 26 and 27 (see FIG. 6), further measuring positions 47 and 48 are provided which are located opposite to one another in a plane which is arranged vertically with respect to the plane of the other measuring positions.

The measuring positions 47 and 48 can be connected in the same manner as, for example, the measuring positions 1 and 3 of the first illustrative embodiment. The measuring positions 47 and 48 are used to pick up also radial forces which act vertically with respect to the radial forces hitherto discussed. A bearing according to FIG. 6, which is modified according to FIG. 8, could be used, for example, for a measuring device in a processing center whereas a bearing according to FIG. 6 would be quite adequate, for example, for a measuring device in a thread grinding machine.

We claim:

1. A device for measuring forces including:

a ball or roller bearing having concentric inner and outer rings for accommodating at least first and second rows of rolling elements therebetween, first and second resistance strain gauges on said ball or roller bearing mounted at first (1) and second (3) measuring positions proximate said first row for sensing cyclic strains applied thereto, a third resistance strain gauge mounted on said ball or roller bearing at a third measuring position (2) proximate said second row for sensing cyclic strains applied thereto, said ball or roller bearing being adapted to absorb radial and axial forces applied thereto, said first, second and third strain gauges being adapted to change resistance and provide a signal in response to cyclic strains applied to said respective measuring positions, first (17) and second (18) and third (14) amplifiers coupled to the output of said first, second and third strain gauges, respectively, first (19), second (20) and third (16) rectifiers coupled to the outputs of said first, second and third amplifiers, respectively, a compensator (15) coupled between the output of said third amplifier (14) and the input of said third rectifier (16) for compensating for bearing ratio percentages, and the apparent axial force resulting therefrom, with only radial forces acting on said first and second rows of rolling elements, said compensator being adapted to reinforce the weaker signal of the signals proceeding from the first and third measuring positions, to which the radial forces are applied in the same direction, until said apparent axial force is eliminated, and a subtractor (22) for subtracting said compensated signal at the output of said third rectifier (16) from the signal at the output of said first rectifier (19) to provide a different signal $U_A$ corresponding to actual applied axial force.

2. A device according to claim 1 further including an adder (21) interposed between the output of said first rectifier (19) and said subtractor (22) for adding a correction voltage ($U_S$) to the output signal from said first rectifier.

3. A device according to claims 1 or 2 wherein said compensator (15) is a rectifier.

4. A device according to claim 1 further including a second subtractor (23) coupled to the outputs of said first (19) and second (20) rectifiers for providing a difference signal $U_R$ corresponding to actual applied radial force.

5. A device for measuring forces including:

a ball or roller bearing having concentric inner and outer rings for accommodating at least first and second rows of rolling elements therebetween, first and third resistance strain gauges mounted on said ball or roller bearing at first (24) and third (26) measuring positions proximate said first row, second and fourth resistance strain gauges mounted on said ball or roller bearing at second (25) and fourth (27) measuring positions proximate said second row, first (28), second (29), third (30) and fourth (31) amplifiers coupled to the outputs of said first, second, third and fourth strain gauges respectively, first (22), second (33), third (34) and fourth (35) rectifiers coupled to the outputs of said first, second, third and fourth amplifiers, respectively, a first adder (39) for adding signals from the outputs of said first and third rectifiers, a second adder (40) for adding signals from the outputs of said second and fourth rectifiers, and a first subtractor (41) for subtracting signals from the outputs of said first and second adders to provide a difference signal $U_A$ corresponding to actual axial forces.

6. A device according to claim 5 further including a third adder (36) coupled to the outputs of said first and second rectifiers, a fourth adder (37) coupled to the outputs of said third and fourth rectifiers, and a second subtractor (38) coupled to the outputs of said third and fourth adders to provide an output signal $U_R$ which corresponds to actual radial force.

7. A device according to claims 1 or 5, characterized in that all measuring positions (1, 2, 3 and 24–27) and the longitudinal axis (13) of the bearing (8) are essentially located in one plane.

8. A device according to claims 1 or 5, characterized in that the length (1) of the gratings of the resistance strain gauges (4) arranged at the measuring positions is at most equal to the length of the rolling elements (11) projected onto the measuring position.

9. A device according to claims 1 or 5, characterized in that at each measuring position (24, 25; 47, 48) two resistance strain gauges (4) are arranged.

* * * * *